United States Patent [19]

November

[11] 3,986,656

[45] Oct. 19, 1976

[54] COLLAPSIBLE PACKAGE-HOLDING STRUCTURE

[75] Inventor: Daren November, New York, N.Y.

[73] Assignee: Robert H. Dickinson, Plandome, N.Y.

[22] Filed: Feb. 23, 1976

[21] Appl. No.: 660,169

[52] U.S. Cl. ................................. 229/15; 217/22
[51] Int. Cl.² ........................................... B65D 5/48
[58] Field of Search ................. 229/15, 42; 217/22, 217/23, 32, 33

[56] References Cited
UNITED STATES PATENTS

| 956,252 | 4/1910 | Wilson | 229/15 UX |
|---|---|---|---|
| 1,554,077 | 9/1925 | Fay | 229/15 |
| 1,990,829 | 2/1935 | Jensen | 229/15 |
| 3,109,361 | 11/1963 | Nicoli | 229/15 UX |
| 3,199,759 | 8/1965 | Hickin | 229/15 |

FOREIGN PATENTS OR APPLICATIONS

| 1,479,150 | 3/1967 | France | 229/15 |
|---|---|---|---|
| 562,778 | 7/1944 | United Kingdom | 229/15 |

*Primary Examiner*—Davis T. Moorhead
*Attorney, Agent, or Firm*—Bauer, Amer & King

[57] ABSTRACT

An area divider, easy to erect and disassemble, intended for placement in the back of a station wagon or the like and to be used to hold erect bags of groceries during transit of the vehicle, thereby minimizing spillage of the contents of the bags.

4 Claims, 5 Drawing Figures

U.S. Patent   Oct. 19, 1976   3,986,656
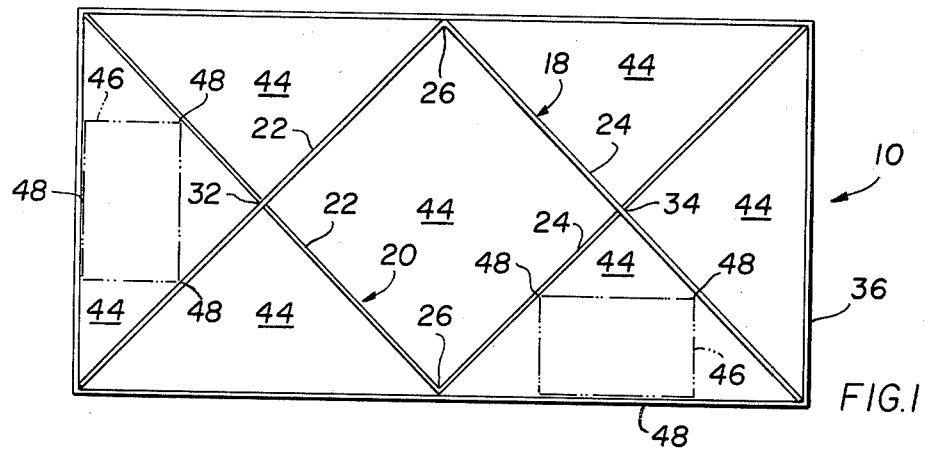
FIG.1
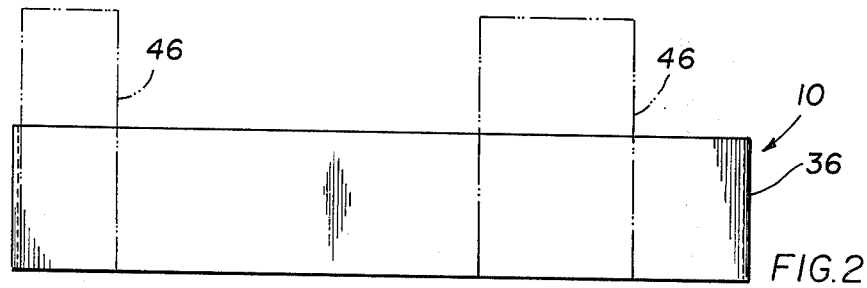
FIG.2
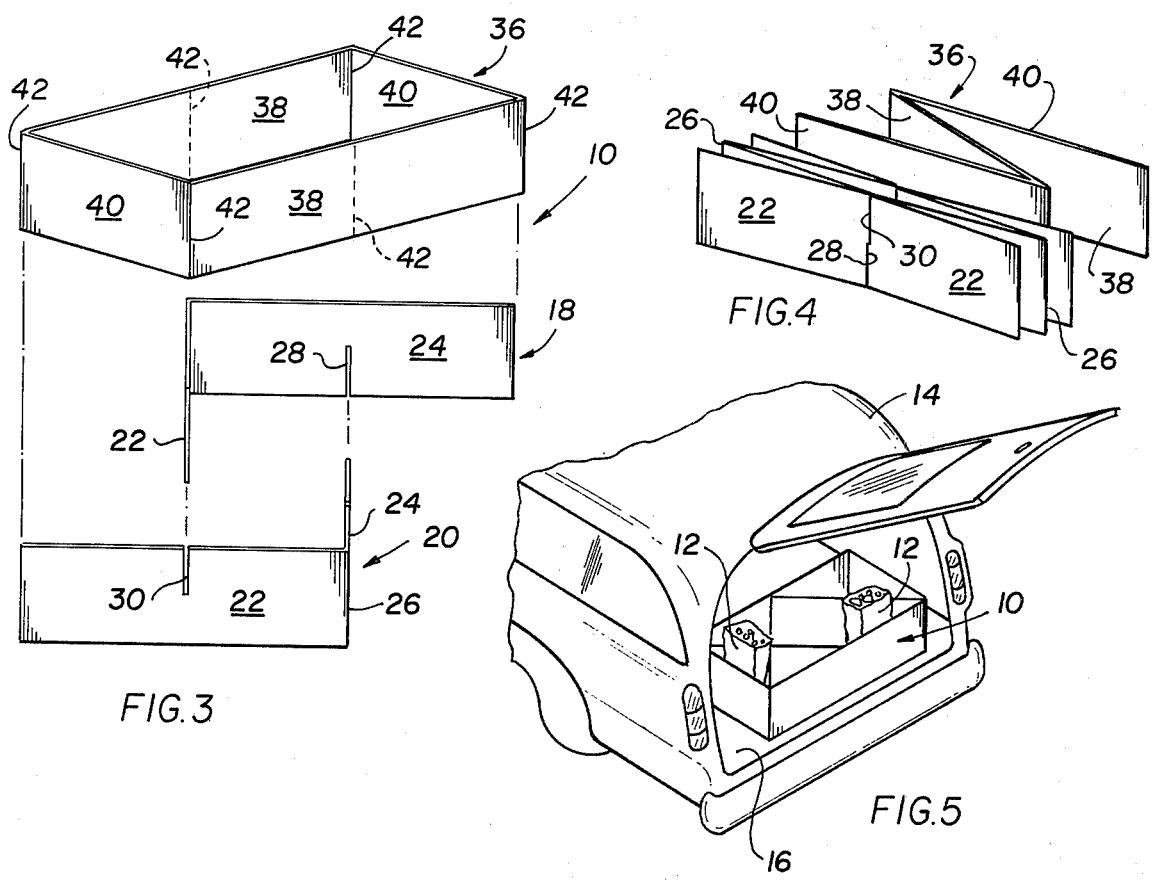
FIG.3
FIG.4
FIG.5

COLLAPSIBLE PACKAGE-HOLDING STRUCTURE

The present invention relates generally to a collapsible package-holding rack, and more particularly to a cardboard or similarly economically constructed device to minimize the movement of packages in a station wagon loading area.

As generally understood, after a food shopping excursion, the bagged groceries must be transported home, use at that time typically being made of a station wagon or car trunk to store the bags. Assuming use of a station wagon, the same of course has an ample rear load-carrying area for the grocery-filled bags. In fact, the roominess of the storage area actually creates a problem, since the bags invariably fall during transit of the vehicle because they are so much smaller than their storage area and therefore are not adequately propped or supported against movement.

Broadly, it is an object of the present invention to provide a convenience device for station wagons or the like, which contributes to its advantageous use for food shopping and other such chores, and which otherwise overcomes shortcomings of the prior art. Specifically, it is an object to provide an inexpensive area divider having compartments, to individually accommodate the grocery bags, and after such use, is designed to have a compact condition which facilitates its storage until it is again needed.

A collapsible package-holding device demonstrating objects and advantages of the present invention has an operative erect condition for delineating the loading area of a vehicle into reduced sized package-accommodating areas so as to confine packages positioned therein against movement during transit of said vehicle, said structure in its erect condition including a cooperating pair of V-shaped cardboard dividers each having a medial fold line and two panels extending therefrom operatively arranged in criss-crossing relation. Provision is made for interconnecting slots in the respective panels adapted in practice to engage each other in their planes of intersection. Completing the device is a rectangular cardboard outer member with fold lines in each corner having an operative position and sized to form an enclosure about the pair of dividers to thereby form seven reduced-sized package compartments within the area bounded by the outer member and occupied by the dividers for package storage during vehicle transit. As explained subsequently herein, following its package-holding interval of use, the structure is readily collapsible into a compact storage condition upon disassembly of the outer member from about the dividers and the folding of these components about their respective fold lines.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a plan view of a package-holding structure according to the present invention;

FIG. 2 is a side elevational view illustrating further structural features;

FIG. 3 is a perspective view illustrating how the structure is assembled and disassembled;

FIG. 4 is a perspective view illustrating the collapsed compact storage condition for the components of the holder; and FIG. 5 illustrates how the structure hereof is typically used.

Reference is now made to the drawings wherein there is shown a collapsible package-holding structure, generally designated 10, demonstrating objects and advantages of the present invention. As is perhaps best illustrated in FIG. 5, after a typical shopping excursion, one must transport from the supermarket several packages 12 of groceries and, typically, this is done using a vehicle 14 which may have a rear trunk or, as illustrated in FIG. 5, may be a station wagon. Assuming the latter, a station wagon 14 of course has ample rear load-carrying area 16, but this, in and of itself, does not facilitate the carrying of the packages 12. In fact, the roominess of the area 16 actually presents a problem in that it is so much larger than the packages 12 that during transit of the vehicle 14 the packages have a tendency to fall and the contents thereof spill from the bags. In the above connection, a part of the present invention is the recognition that the load-carrying area 16 of the vehicle 14, whether it be the back of a station wagon or the area of a trunk should be delineated into reduced sized package-accommodating areas so that the packages 12 can be placed in these areas and thus in actual contact with structure which will minimize their movement during transit of the vehicle 14. This, in an obvious manner, will correspondingly minimize the falling of the individual packages 12 and thus the spilling of the contents therefrom.

Structure 10 achieves not only the object of subdividing or delineating loading area 16 into reduced sized compartments or areas better suited to accommodate the individual packages 12, but said device 10 hereof also constitutes a structure which is readily collapsible into a compact storage condition when not in use, all as is perhaps best illustrated in FIG. 4 and as will be explained in detail as the description proceeds. As illustrated in the drawings, and as may best be appreciated by examination of FIGS. 1 and 3, structure 10 includes two, almost identically constructed, V-configurated dividers 18 and 20, each preferably constructed of cardboard, and each being comprised of two panels 22, 24 foldable about a centrally located fold line 26. The only difference in the dividers 18 and 20 concerns, as best illustrated in FIG. 3, the location of slots which facilitate interconnection of the dividers. Specifically, slots 28 are provided in the lower portion of the panels of divider 18 whereas identical slots 30 are provided in the upper portion of the panels of divider 20. As a consequence, movement of the dividers 18 and 20 in opposing directions results in the slots 28 and 30 interfitting one within the other and, more particularly, results in the unslotted portions of the panels of these dividers engaging in the slots. This, in turn, results in the respective panels 22 and 24 interconnecting with each other in criss-crossing relation, all as is clearly illustrated in FIG. 1, at the planes of intersection 32 and 34.

The other component of the structure 10 consists of a rectangular member 36 also preferably constructed of cardboard, which consists of two long and two short interconnected panels 38 and 40, respectively, the interconnection occurring at fold lines 42 located in each of the four corners of the rectangle.

In the construction of the package-holding structure or device 10, the dividers 18 and 20 are interconnected in their criss-crossing relation as previously explained, and the rectangular cardboard outer member 36 is then placed about the dividers such that the free ends of the panels 22, 24 of the dividers seat in the corners adjacent the fold lines 42. As a result of this assembly of the parts 18, 20 and 36, the device 10 is provided with seven triangular shaped compartments, herein individually and collectively designated 44. The central compartment 44 is actually double the size of a single compartment. It is significant, nevertheless, that the total volume bounded by the device 10 is subdivided into reduced sized package-accommodating areas 44 with the result that the placement of packages, such as paper bags 46 filled with groceries, when placed within the confines of the device 10, particularly in the six peripheral triangular compartments 44 thereof, are less apt during transit of the vehicle 14 to experience tipping over. This is because the packages 46 make contact, as for example at points 48 (see FIG. 1) with the component members 18, 20, and 36 of the device 10.

An advantage of the triangular shape of the compartments 44 is that the corners thereof are of a progressively diminishing extent or size. Thus, different ranges of sizes of grocery bags can be located in the compartments 44 and contact established at the points 48 depending upon the location of the packages in relation to a corner of the triangular compartment 44. Stated another way, the triangular corners provide the opportunity to wedge the packages in place, whereas any other shape of compartment may not provide this advantage.

Following use of the device or structure 10, it is a relatively simple matter to disassemble the dividers 18 and 20 from their position within the member 36, and fold these component parts into a compact storage condition. FIG. 4, in particular, illustrates how the dividers 18 and 20, while still interconnected, are folded, somewhat like an accordion, into a condition in which the interconnected slots 28 and 30 are moved into adjacent position with each other. In similar fashion, the rectangular member 36 is folded about the fold lines 42 so that the panels move into adjacent position so that there is minimum thickness to the member 36 and the other dimension consists only of the length of a panel 38 and a panel 40. Alternatively, as shown in FIG. 4, the long side panels 38 of member 36 can be provided with medial fold lines which then permits folding this member into the compact Z-shape illustrated in FIG. 4. Thus, both member 36 and the dividers 18 and 20 are readily stored until it is again necessary to make use of the device 10. Also, being fabricated of cardboard, it should be readily appreciated that structure 10 is capable of being economically produced.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A collapsible structure having an operative erect condition for delineating the loading area of a vehicle into reduced sized package-accommodating areas so as to confine packages positioned therein against movement during transit of said vehicle, said structure in its erect condition comprising a cooperating pair of V-shaped cardboard dividers each having a medial fold line and two panels extending therefrom operatively arranged in cross-crossing relation and having interconnecting slots in said respective panels for engaging each other in their planes of intersection, and a rectangular cardboard outer member with fold lines in each corner having an operative position and sized to form an enclosure about said pair of dividers to thereby form seven reduced-sized package compartments within the area bounded by said outer member and occupied by said dividers for package storage during vehicle transit, whereby following its package-holding interval of use said structure is readily collapsible into a compact storage condition upon disassembly of said outer member from about said dividers and the folding thereof about said respective fold lines.

2. A collapsible package-holding structure as defined in claim 1 wherein the slots of said one divider are in an upper portion thereof and are in the lower portion of said other divider, whereby assembly movement in opposing directions projects the unslotted portions of said divider panels in said slots to achieve said interconnection of said dividers.

3. A collapsible package-holding structure as defined in claim 2 wherein said slots are sized to provide clearance about said unslotted panel portions projected therein, to thereby facilitate positioning within said slots and to provide collapsing movement of said crisscrossing panels into adjacent position with each other to correspondingly provide said compact storage condition to said dividers.

4. A collapsible package-holding structure as defined in claim 3 wherein the free ends of the panels of said dividers are seated in the four corners of said outer member, whereby said outer member and dividers cooperate to define package-accommodating compartments characterized by a shape having at least one corner bounding an area of progressively diminishing size, whereby each said compartment is adapted to accommodate a range of sizes of packages according to the relative location thereof within said corner.

* * * * *

UNITED STATES PATENT OFFICE
CERTIFICATE OF CORRECTION

Patent No. 3,986,656  Dated October 19, 1976

Inventor(s) Daren November

It is certified that error appears in the above-identified patent and that said Letters Patent are hereby corrected as shown below:

Claim 1, line 9, the word "cross-crossing" should read
-- criss-crossing --.

Signed and Sealed this

Twenty-eighth Day of December 1976

[SEAL]

Attest:

RUTH C. MASON  
*Attesting Officer*

C. MARSHALL DANN  
*Commissioner of Patents and Trademarks*